US008484145B2

(12) United States Patent
Lacaille

(10) Patent No.: US 8,484,145 B2
(45) Date of Patent: Jul. 9, 2013

(54) STANDARDIZING DATA USED FOR MONITORING AN AEROENGINE

(75) Inventor: Jérôme Lacaille, Rosny Sous Bois (FR)

(73) Assignee: SNECMA, Paris (FR)

( * ) Notice: Subject to any disclaimer, the term of this patent is extended or adjusted under 35 U.S.C. 154(b) by 159 days.

(21) Appl. No.: 13/139,741

(22) PCT Filed: Dec. 14, 2009

(86) PCT No.: PCT/FR2009/052510
§ 371 (c)(1),
(2), (4) Date: Aug. 31, 2011

(87) PCT Pub. No.: WO2010/076468
PCT Pub. Date: Jul. 8, 2010

(65) Prior Publication Data
US 2011/0307431 A1    Dec. 15, 2011

(30) Foreign Application Priority Data
Dec. 15, 2008 (FR) .................................... 08 58608

(51) Int. Cl.
*G06F 17/00* (2006.01)
*G06N 3/00* (2006.01)
(52) U.S. Cl.
USPC .............................. 706/17; 600/481; 702/189
(58) Field of Classification Search
USPC ....................................................... 706/17
See application file for complete search history.

(56) References Cited

U.S. PATENT DOCUMENTS

| 4,215,412 | A | 7/1980 | Bernier et al. | |
|---|---|---|---|---|
| 6,135,966 | A * | 10/2000 | Ko | 600/481 |
| 6,466,858 | B1 | 10/2002 | Adibhatla et al. | |
| 7,020,595 | B1 | 3/2006 | Adibhatla et al. | |
| 2002/0178133 | A1 * | 11/2002 | Zhao et al. | 706/21 |

FOREIGN PATENT DOCUMENTS

| EP | 1 103 926 | 5/2001 |
|---|---|---|
| EP | 1 204 076 | 5/2002 |

OTHER PUBLICATIONS

International Search Report issued Apr. 13, 2010 in PCT/FR09/52510 filed Dec. 14, 2009.

* cited by examiner

*Primary Examiner* — Kakali Chaki
*Assistant Examiner* — Kalpana Bharadwaj
(74) *Attorney, Agent, or Firm* — Oblon, Spivak, McClelland, Maier & Neustadt, L.L.P.

(57) ABSTRACT

A method and a system for standardizing data used for monitoring an aeroengine, and including: operating over time to collect time-series measurements from the aeroengine; calculating from the time-series measurements a set of indicators $Y=(y_1, \ldots, y_j, \ldots, y_m)$ specific to elements of the engine; identifying from the time-series measurements an exogenous data set $X=(x_1, \ldots, x_n)$ representative of external context acting on the set of indicators Y; defining a conditional multidimensional model simultaneously handling the indicators of the set of indicators Y while taking account of the exogenous data set X to form a set of estimators $\hat{Y}=(\hat{y}_1, \ldots, \hat{y}_j, \ldots, \hat{y}_m)$ corresponding to the set of indicators $Y=(y_1, \ldots, y_j, \ldots, y_m)$; and normalizing each estimator $\hat{y}_j$ as a function of a reference value for the corresponding indicator $y_j$ and of a difference between each estimator $\hat{y}_j$ and corresponding indicator $y_j$ so as to form a set of standardized values $\tilde{Y}=(\tilde{y}_1, \ldots, \tilde{y}_j, \ldots, \tilde{y}_m)$.

14 Claims, 4 Drawing Sheets

STANDARDIZING DATA USED FOR MONITORING AN AEROENGINE

FIELD OF THE INVENTION

The present invention relates to the field of monitoring an aeroengine (aircraft engine). In particular, the invention relates to standardizing data used for monitoring the aeroengine.

In numerous industries, such as the aviation or space industries, it is of fundamental importance to master the behavior of an engine in order to improve the effectiveness of its design and maintenance. This depends on the capacity to acquire and process data that is measured by monitoring sensors.

One of the problems encountered by engine experts when interpreting or analyzing measurements is the fact that a given engine never operates under exactly the same conditions. For an aircraft engine performing operational flights, measurement acquisition conditions are always different: they depend on the piloting, the weather, the flight path, the state of the engine, etc.

However, an effective anomaly detector must be capable of detecting a defect regardless of context. Nevertheless, it is very expensive to maintain a continuous monitoring application, and in addition it is very difficult to perform specific calculations for each stage of flight and for each external condition.

Thus, a monitoring tool must be capable of operating identically regardless of the external acquisition and data conditions. It is therefore necessary, before beginning any monitoring, to reduce the data to a standard environment.

At present, the method of standardizing the data is a conventional normalization method that does no more than calculate the mean of each monitoring indicator as defined from measurements collected from the aircraft engine, calculate the difference between said mean and a measurement that has been taken, and then divide the difference by a standard deviation. The average and the standard deviation are calculated a priori for a previously digitized data series.

The drawback of that method is that it cannot handle dependencies on exogenous data, nor can it handle dependency relationships between the indicators themselves.

There exist other methods that consist in creating multivariate normalizations based on compression algorithms such as principle component analysis (PCA). Nevertheless, they require a large amount of computation time and they lead to dimensionless indicators that are not meaningful to engine experts.

OBJECT AND SUMMARY OF THE INVENTION

The present invention provides a method of standardizing data used for monitoring an aeroengine, the method comprising the following steps:
  collecting time-series measurements over time concerning said aeroengine;
  from said time-series measurements, calculating a set of indicators $Y=(y_1, \ldots, y_j, \ldots, y_m)$ that are specific to elements of said engine;
  from said time-series measurements, identifying an exogenous data set $X=(x_1, \ldots, x_n)$, representative of the external context acting on said set of indicators Y;
  defining a conditional multidimensional model simultaneously handling the indicators of said set of indicators Y while taking account of said exogenous data set X to form an estimator set $\hat{Y}=(\hat{y}_1, \ldots, \hat{y}_j, \ldots, \hat{y}_m)$ corresponding to said indicator set $Y=(y_1, \ldots, y_j, \ldots, y_m)$; and
  normalizing each estimator $\hat{y}_j$ as a function of a reference value for the corresponding indicator $y_j$ and of a difference between each said estimator $\hat{y}_j$ and said corresponding indicator $y_j$ to form a set of standardized values $\tilde{Y}=(\tilde{y}_1, \ldots, \tilde{y}_j, \ldots, \tilde{y}_m)$.

This method makes it possible to standardize the indicators by eliminating dependencies relative to the external context while handling stochastic interdependency relationships between the indicators themselves. Thus, aeroengine monitoring may take place identically, regardless of external acquisition conditions. The standardized values can be considered as observations that were acquired under strictly identical conditions for each occasion the engine is monitored or for each flight of the aircraft.

In another aspect of the present invention, the definition of said conditional multidimensional model comprises the following steps:
  for each indicator $y_j$ of said set of indicators Y, constructing a projection space $E^{(j)}=\sigma(Y^{(j)},X)$ generated by analytic transformations of a subset of indicators $Y^{(j)}=(y_1, \ldots, y_{j-1}, y_{j+1}, \ldots y_m)$ comprising all of the indicators of said set of indicators Y except each said indicator $y_j$ and by said exogenous data set X; and
  for each indicator $y_j$ of said set of indicators Y, calculating a corresponding estimator $\hat{y}_j$ by projecting said indicator $y_j$ using a regression technique onto said projection space $E^{(j)}=\sigma(Y^{(j)},X)$, thereby forming a set of estimators $\hat{Y}=(\hat{y}_1, \ldots, \hat{y}_j, \ldots, \hat{y}_m)$.

The analytic transformations may naturally include an identity transformation. Thus, the space may be formed from the subset of indicators and from the exogenous data set and also by analytic applications performed on said data. This makes it possible to provide information about the physics of the data that is being standardized and optionally makes it possible to enter knowledge that may improve the pertinence of the model. Furthermore, the standardized values are not abstract magnitudes but genuine standardized signatures of the initial indicators, having the same dimensions, but freed of the relationships of dependency with the acquisition context. This makes it possible not only to reduce engine monitoring to a standard environment, but also to facilitate interpretation of the monitoring by experts.

Advantageously, said time-series measurements are collected during normal operation of said aeroengine.

Thus, it is very easy to acquire time-series measurements since, as a general rule, the engine is operating normally. Furthermore, by making use solely of normal operating data for calibration purposes, the multidimensional model is easily verified in terms of robustness, given the greater availability of such measurements.

Each standardized value $\tilde{y}_j$ may be calculated by adding a mean or reference value for the corresponding indicator $\bar{y}_j$ to a difference between the corresponding indicator $y_j$ and the corresponding estimator $\hat{y}_j$, using the following equation: $\tilde{y}=\bar{y}_j+(y_j-\hat{y}_j)$.

Thus, the standardization values are easy to calculate and continue to have a meaning that is clear for experts, while being independent of flight conditions.

Advantageously, the method includes analyzing robustness of each estimator using a cross evaluation technique serving to select an optimum projection space.

The cross evaluation technique is very easy to implement because of the large quantity of normal operating data.

According to a feature of the present invention, said projection space is constructed using expert criteria with the help of physical formulations of relationships between the indicators and between the indicators and the exogenous data.

Thus, by identifying the way in which the data is interconnected from physical knowledge about the measurements, the engine expert continues at all times to be capable of interpreting and interacting with the model.

According to another feature, said space is constructed automatically by using a neural network.

Thus, when the expert does not have a priori knowledge about the relationships between the indicators themselves and/or the relationships between the indicators and the exogenous data, the model can itself search for such relationships by analyzing normal operation data.

In particular, said neural network may be a model having nodes.

Advantageously, the indicators of said set of indicators $Y=(y_1, \ldots, y_j, \ldots, y_m)$ are specific to physical and/or logical elements of said engine.

Thus, the indicators may indicate a particular element or a specific task from an entire set of engine elements, thus enabling the performance in the state of the engine to be better analyzed.

The indicators of said set of indicators $Y=(y_1, \ldots, y_j, \ldots, y_m)$ may be calculated using expert criteria by constructing an FMECA (failure modes, effects and criticality analysis).

This makes it possible to use the knowledge of engine experts in order to collect indicators that are useful when analyzing the engine.

The indicators may be identified by referencing particular points or particular functions summarizing the details or the shapes of certain curves representative of said time-series measurements.

Advantageously, the exogenous data $X=(x_1, \ldots, x_n)$ acting on the indicators is identified using expert criteria by dependency analysis enabling the context data associated with the indicators to be listed.

According to a feature of the present invention, said regression may be a linear regression.

The invention also provides a system for standardizing data used for monitoring an aeroengine the system comprising:
  means for operating over time to collect time-series measurements from said aeroengine;
  means for calculating from said time-series measurements a set of indicators $Y=(y_1, \ldots, y_j, \ldots, y_m)$ specific to elements of said engine;
  means for identifying from said time-series measurements an exogenous data set $X=(x_1, \ldots, x_n)$ representative of the external context acting on said set of indicators Y;
  means for defining a conditional multidimensional model simultaneously handling the indicators of said set of indicators Y while taking account of said exogenous data set X to form a set of estimators $\hat{Y}=(\hat{y}_1, \ldots, \hat{y}_j, \ldots, \hat{y}_m)$ corresponding to said set of indicators $Y=(y_1, \ldots, y_j, \ldots, y_m)$; and
  means for normalizing each estimator $\hat{y}_j$ as a function of a reference value for the corresponding indicator $y_j$ and of a difference between each said estimator $\hat{y}_1$ and said corresponding indicator $y_j$ so as to form a set of standardized values $\tilde{Y}=(\tilde{y}_1, \ldots, \tilde{y}_j, \ldots, \tilde{y}_m)$.

The invention also provides a computer program including instructions for implementing the standardization method using the above steps when executed by processor means.

BRIEF DESCRIPTION OF THE DRAWINGS

Other features and advantages of the device and a method of the invention appear better on reading the following description made by way of non-limiting indication with reference to the accompanying drawings, in which.

DETAILED DESCRIPTION OF EMBODIMENTS

Figure 1:
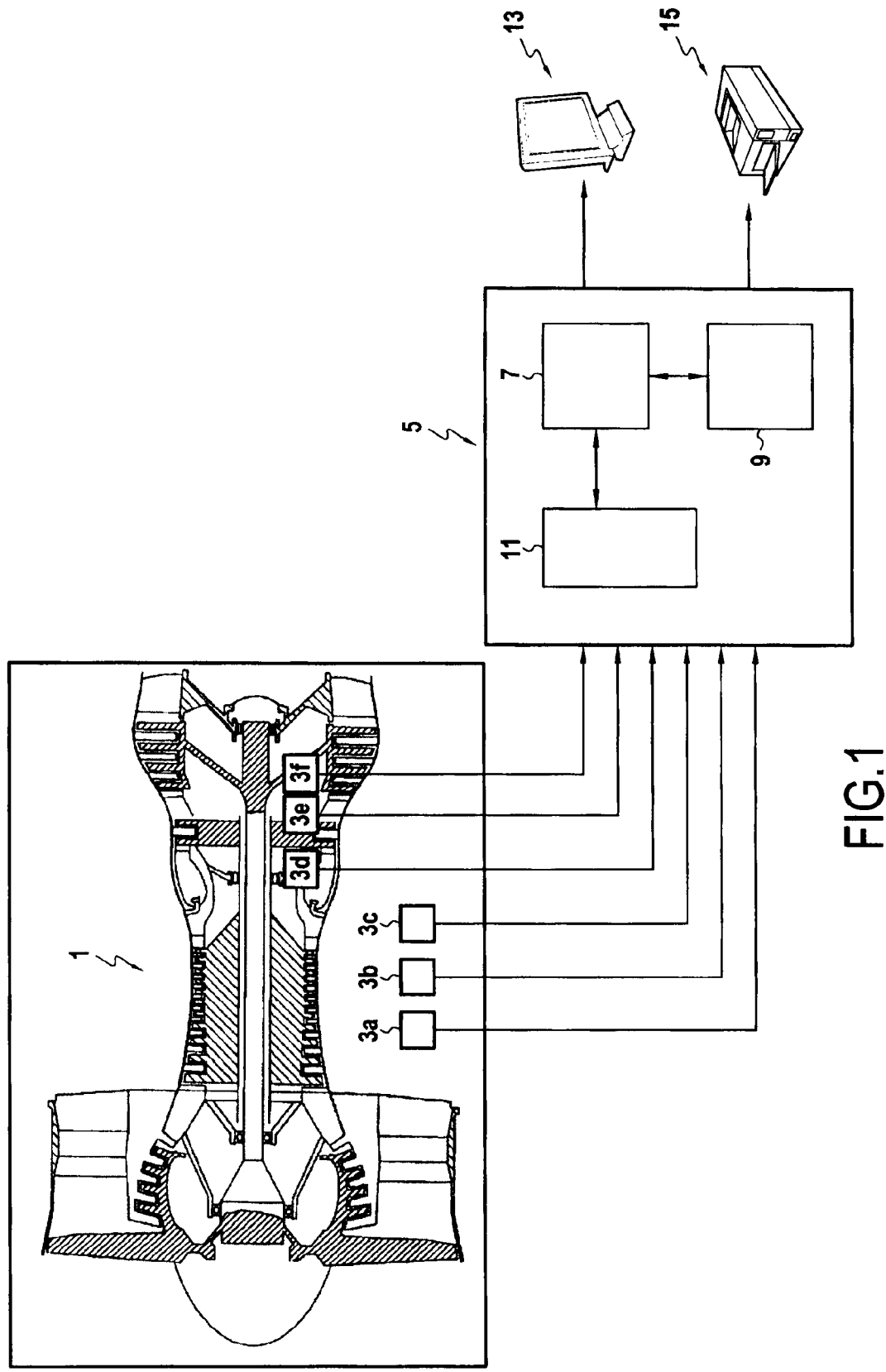
FIG. 1 shows the hardware means implemented in the system or method that may be used for standardizing data used in monitoring an aeroengine in accordance with the invention.

FIG. 1 shows the hardware means implemented in the system or the method of the invention for standardizing data used for monitoring an aeroengine 1.

The system comprises a plurality of sensors 3a-3f for measuring data reflecting the state of the engine 1 and external or internal context data that might affect the operation of the engine 1. The system also includes data processor means 5 such as a calculator or a computer capable of being used for executing a computer program designed to implement the method of the invention. The processor means 5 comprise the hardware means that are usually to be found in a computer. More particularly, the processor means 5 comprise a central unit 7 that executes sequences of program instructions of the method of the invention, a central memory 9 that stores data and programs that are running, digital data storage means or media 11 for conserving data, input peripherals (sensors 3a-3f, keyboard, mouse, ...), and output peripherals (screen 13, printer 15, ...) for perceiving the result of the standardization.

Figure 2:
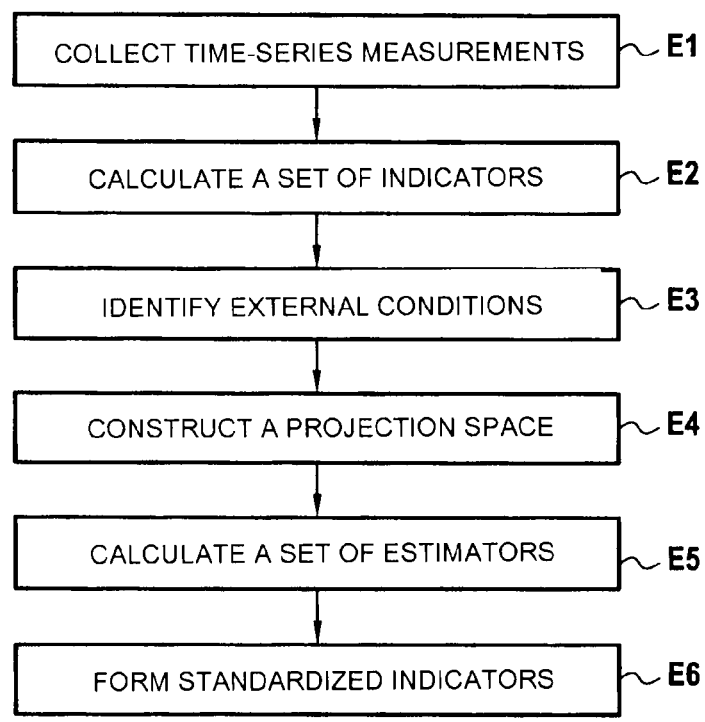
FIG. 2 is a flow chart showing the main steps for standardizing the data used for monitoring the FIG. 1 aeroengine.

In accordance with the invention, FIG. 2 shows the main steps implemented by the processor means 5 in order to standardize the data used for monitoring the aeroengine.

Step E1 relates to identifying raw measurements from which it is a priori possible to extract useful information about the aeroengine 1 that is to be monitored. The processor means 5 are configured to act over time to collect and digitize time-series measurements that are acquired by the sensors 3d-3f of the aeroengine 1 while in operation, together with context measurements acquired by the sensors 3a-3c representative of external environmental conditions.

Under operating conditions, the number of sensors 3a-3f is not very large, but acquisitions are performed at different frequencies, and the elements that can be deduced therefrom may be very numerous. For example, for a CFM engine, nine to 12 sensors may be installed for measuring pressures, flow rates, and temperatures at a low frequency of 32 hertz (Hz), and four sensors may be installed for measuring the speeds of rotation of the shafts of the engine 1 and the vibrations of the engine 1 at a high frequency, which high frequency may be as much as 20 kilohertz (kHz) or higher.

Furthermore, it should be observed that the time-series measurements may very easily be collected in normal operation of the aeroengine 1, given the great availability of such measurements.

Step E2 relates to defining indicators. Thus, the processor means 5 are configured to calculate from the time-series measurements a set of indicators $Y=(y_1, \ldots, y_j, \ldots, y_m)$ that are specific to elements of the engine 1.

It should be observed that the indicators may be specific to elements that are physical, i.e. indicative of a particular element of the engine 1, or to elements that are logical, i.e. indicative of a specific task of an entire set of elements of the engine 1. More particularly, a physical element is a real component of the engine 1, such as, for example, the high pressure (HP) basic engine, the stator valves, etc. A logical element or system refers to a group of components of the engine 1 performing some specific task, such as the starter system, the lubrication system, performance, etc.

Furthermore, the indicators $Y=(y_1, \ldots, y_j, \ldots, y_m)$ may be calculated on the basis of expert criteria. For example, experts may formulate the indicators in a document known as "failure modes, effects and criticality analysis" (FMECA). That document lists the failures, the pieces of equipment concerned, the causes, the consequences, and also the indicators calculated from the above measurements enabling a phenomenon to be identified, with each being associated with a description of the observed effects. Furthermore, each fault may be described by the effect observed on the specific results calculated from the time-series measurements.

The indicators may be identified by "pointers" such as, for example, by identifying particular points or particular functions that summarize the details or the shapes of certain curves representative of the time-series measurements.

For example, in order to analyze the starting capacity of the engine 1, experts extract various durations and specific values or perform calculations that have a meaning that is clear in terms of starting. Amongst these indicators, a delay indicator may be defined indicating the time needed by the HP shaft of the engine to reach a given speed after the fuel valve has been opened. Consideration may also be given to an indicator about the maximum acceleration of the HP shaft and to many other similar indicators.

In order to analyze performance, experts focus for example on measurements of temperature, pressure, and fuel flow. Thereafter, they can construct wear indicators that are expressed, by way of example, in terms of fuel consumption from one flight to another.

In order to analyze the shaft bearing of the engine 1, vibration specialists observe from specific frequencies to isolate times of rotation that depend on the dimensions of the various elements of the shaft: ring radii, ball diameters, etc.

Step E3 relates to identifying external conditions.

More particularly, the processor means 5 are configured to identify from time-series measurements an exogenous data set $X=(x_1, \ldots, x_n)$ representative of the external context acting on the set of indicators Y.

Each measurement collected during a flight is taken under particular external or internal conditions. These conditions, which may have an impact on how the indicators are understood are themselves recorded. The external conditions may comprise external temperatures and pressures, the attitude, and the relative speed of the airplane, and also where the flight is taking place (over the sea, desert, land, etc.), weather conditions (rain, snow, icing, etc.), humidity, etc. Internal conditions may relate to specific uses of the engine (shaft speed, exhaust gas temperature, type of fuel, etc.). All of these measurements may be considered as constituting exogenous data.

Figure 3:
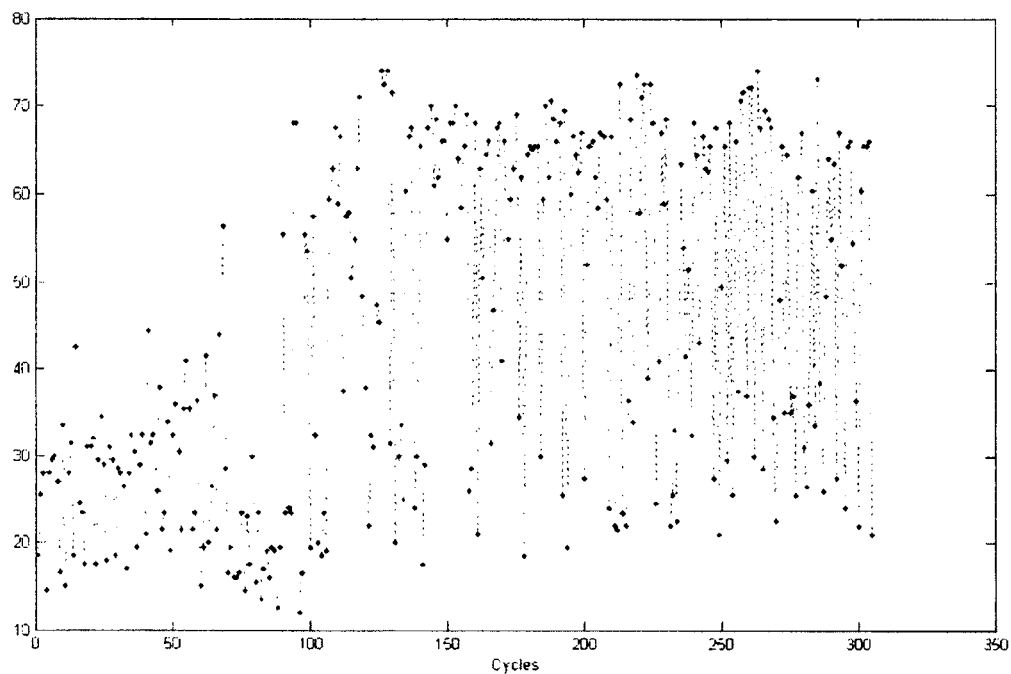
FIG. 3 is a graphical representation showing oil temperature immediately after starting the FIG. 1 aeroengine.

As an example of exogenous data, FIG. 3 is a graphical representation showing oil temperature immediately before starting the engine. It can be seen at once that there are two types of starts corresponding to cold starts and hot starts. This applies typically when an internal measurement (oil temperature) is considered as constituting context data that provides a clear distinction between two classes of start that need to be taken into account when analyzing data.

Advantageously, the exogenous data $X=(x_1, \ldots, x_n)$ involved in the indicators may be identified on the basis of expert criteria. Furthermore, an automatic dependency analysis (by studying correlations or mutual information) also serves quickly to list context data associated with the indicators.

It should also be observed that because the indicators may depend on context, it is also possible for relationships to exist between the indicators themselves. It is not possible directly to eliminate context dependency indicator by indicator, since the result would be to destroy all of the information contained in the indicators. In general, engine experts are aware of the content of the information in the interdependency relationships and they also know the difficulty involved in constructing indicators that are independent.

Figure 4:
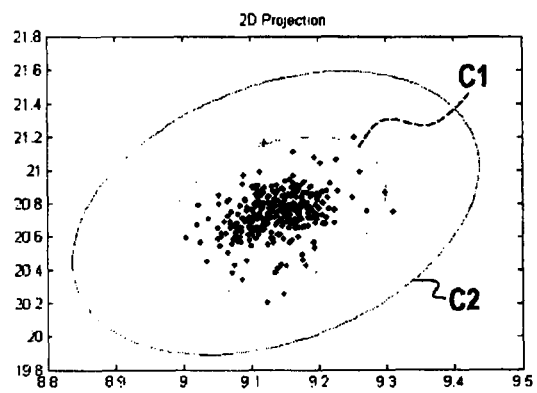
FIG. 4 is a graphical representation showing the starting step delays of the FIG. 1 aeroengine.

By way of example, FIG. 4 is a graphical representation of the starting delay of the engine 1 when using an auxiliary power unit (APU), as a function of the length of time needed for the engine 1 to reach its nominal ground speed. The dashed line curve C1 designates a first level of dispersion about the mean, and the continuous line curve C2 designates a second level of dispersion about the mean.

Thus, the distribution of points in FIG. 4 shows clearly that there exists a relationship between the starting delay of the engine 1 and the time required for it to reach its nominal ground speed. Naturally, the relationship between those two indicators may depend on exogenous data such as the outside temperature or the pressure at the outlet from the APU.

Steps E4 and E5 relate to constructing estimators that are associated with the indicators calculated in step E2.

The processor means 5 are configured to define a conditional multidimensional model that simultaneously handles the indicators of the set of indicators Y while taking account of the exogenous data set X in order to form an estimator set $\hat{Y}=(\hat{y}_1, \ldots, \hat{y}_j, \ldots, \hat{y}_m)$ corresponding to the set of indicators $Y=(y_1, \ldots, y_1, \ldots, y_m)$.

More particularly, step E4 consists in constructing a projection space $E^{(j)}=\sigma(Y^{(j)}, X)$ for each given indicator $y_j$ of the set of indicators Y. This projection space is generated by the exogenous data set X and by analytical transformations of a subset of the indicators $Y^{(j)}=(y_1, \ldots, y_{j-1}, y_{j+1}, \ldots y_m)$, which subset includes all of the indicators of the set of indicators Y other than the given indicator $y_j$. The analytical transformations express physical relationships between the indicators and they may be defined by experts. The analytical transformations may further include an identity transformation, linear or non-linear functions, or transformations providing information about correlations between the different indicators.

For each given indicator $y_j$ of the set of indicators Y, step E5 consists in calculating a corresponding estimator $\hat{y}_j$ by using a regression technique to project the given indicator $y_j$ onto the projection space $E^{(j)}=\sigma(Y^{(j)}, X)$, thus forming the set of estimators $\hat{Y}=(\hat{y}_1, \ldots, \hat{y}_j, \ldots, \hat{y}_m)$.

In other words, for each indicator $y_j$, let: $Y=(y_1, \ldots, y_j, \ldots, y_m)$ be the vector of m indicators, X be the exogenous data vector, and $Y^{(j)}=(y_1, \ldots, y_{j-1}, y_{j+1}, \ldots y_m)$ be the vector of all of the indicators other than $y_j$. Using a regression method, the indicator $y_j$ is then projected onto the projection space $E^{(j)}=\sigma(Y^{(j)}, X)$ in order to determine the estimator $\hat{y}_j$. The regression may be of the neural network type, e.g. using a model with nodes and least-squares minimization. In a variant, the regression may be of the linear type.

Thus, for each indicator, a regression of the observations is constructed on the space generated by the other indicators, the context data, expressions derived from expert analysis, and other functions, e.g. implemented in the form of a model with nodes. The constructed space onto which the observations are projected is of much larger dimension than the initial number of indicators.

Advantageously, the projection space may be constructed using expert criteria with the help of physical formulations of the relationships between the indicators and between the indicators and the exogenous data. The professional knowledge of the expert may be used not only for identifying variables, but also for defining the projection space. For example, there may be measurements of one parameter that depend logarithmically on measurements of another parameter. Other conventional examples may relate to state variables such as enthalpy or energy. By way of example, if energy corresponds to a product of two indicators, then for constant energy the reciprocal of one indicator serves to predict the other indicator.

Otherwise, when the expert does not have a priori knowledge about the relationships between variables, an automatic analysis in normal operation may find such relationships.

Thus, the projection space may also be constructed automatically by using a neural network, for example, e.g. of the type comprising a model with nodes. Under such circumstances, all options may be used simultaneously by default. Furthermore, consideration may be given to non-linear transformations of the indicator that can sometimes be easier to predict. These transformations may be selected from a list of possibilities (logarithm, reciprocal, saturation, . . . ). By default, all acceptable transformations are tested and a selection is made on the basis of a robustness criterion.

The robustness of each estimator may be analyzed using a cross evaluation technique serving to select the best projection space. This technique may be reapplied on invertible functions of each projected estimator, after expert analysis. By way of example, the best regression should be conserved, and it may be easier to model the logarithm of an indicator than its value itself.

In step E6, the processor means 5 are configured to normalize each estimator $\hat{y}_j$ as a function of a reference value for the corresponding indicator $y_j$ and of a difference between each given estimator $\hat{y}_j$ and the corresponding indicator $y_j$ in order to form a set of standardized values $Y=(\tilde{y}_1, \ldots, \tilde{y}_j, \ldots, \tilde{y}_m)$.

In particular, the residue of the model (observation minus estimation) may be added to a mean or reference value that is considered as being a standard value of the indicator.

In other words, each standardized value $\tilde{y}_j$ may be calculated by adding the mean or reference value of the corresponding indicator $\overline{y}_j$ to the difference between the corresponding indicator $y_j$ and the corresponding estimator $\hat{y}_j$ using the following equation $\overline{y}_j = \tilde{y}_j + (y_j - \hat{y}_j)$.

This calculation gives a new observation having the same dimensions as the initial indicators and shows the difference between that which has genuinely been observed and that which ought to be observed, taking account of the exogenous data and the mutual relationships between the indicators.

The standardized indicators will oscillate about their respective mean values as a function of the prediction errors of the model. A normal observation is naturally an observation for which all of the residues are small (i.e. less than a multiple of the standard deviation σ of the estimated error distribution, which in any event is known). In contrast, for an abnormal observation, the signals will be far from their mean values.

Figure 5A:
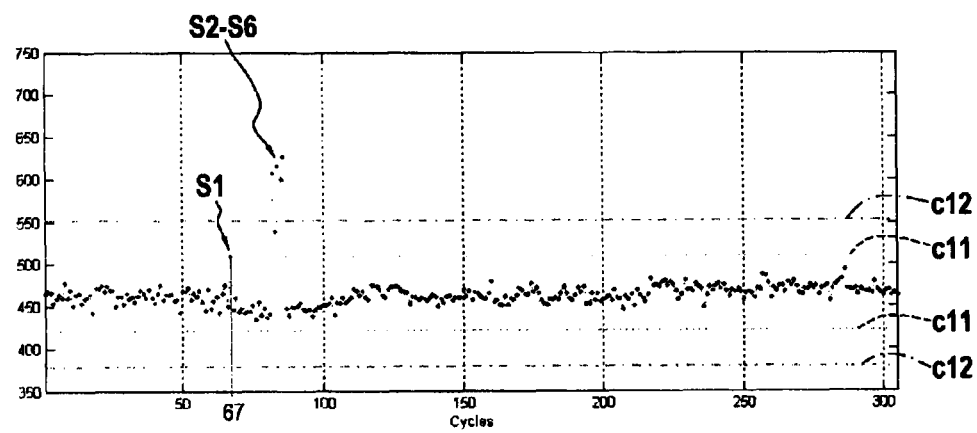
FIGS. 5A and 5B are graphical representations showing the time required to reach maximum acceleration of the low pressure shaft after each occasion the FIG. 1 aeroengine is started.
Figure 5B:
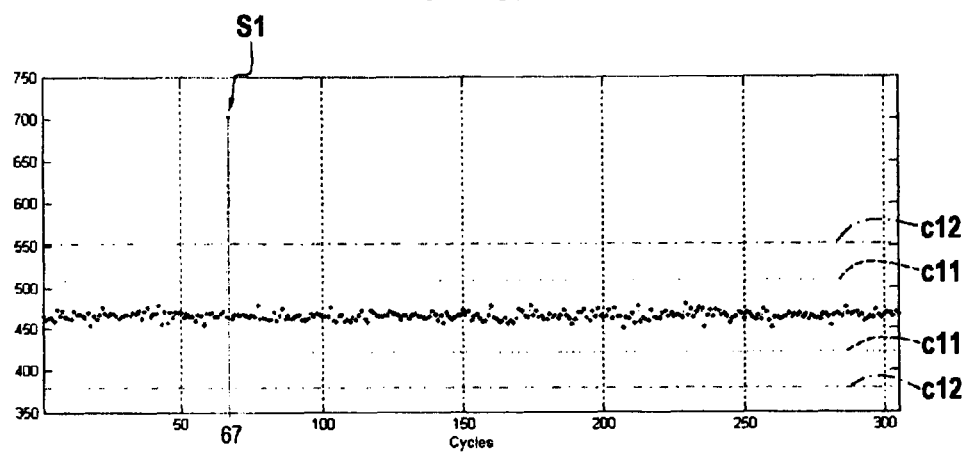

A first example is given in FIGS. 5A and 5B which are graphical representations of an indicator representing the delay for waiting for the low pressure (LP) shaft to reach maximum acceleration (up the ordinate axis) after each start of the engine (along the abscissa axis). Dashed lines c11 designate the +3σ levels about the mean value, and chain-dotted lines c12 designate the +6σ levels about the mean value.

FIG. 5A shows the signals of the initial indicator before standardization and FIG. 5B shows the signals of the indicator after standardization in accordance with the invention.

FIG. 5A shows that there are six signals S1-S6 (between starting cycle number 50 and number 90) that depart from the mean and that are slower in starting.

Nevertheless, the standardization of FIG. 5B that eliminates dependencies relative to external context show that only the signal S1 for starting cycle 67 departs from the mean. This shows clearly that the remote position of the signals S2-S6 was due merely to external conditions and that only the signal S1 persists, and what is more it is now further away from the mean than the corresponding signal in FIG. 5A. The signal S1 is a singleton or aberrant point that is far removed from the set of observations and that is due to the fact that the experts who construct the normal observation data often forget a few aberrations. In any event, this singleton is omitted when analyzing robustness, which analysis may be performed using a cross evaluation technique or a compensated likelihood technique. This analysis selects in random manner a subset of the measurements for calibration and tests the results against the other observations.

Figure 6A:
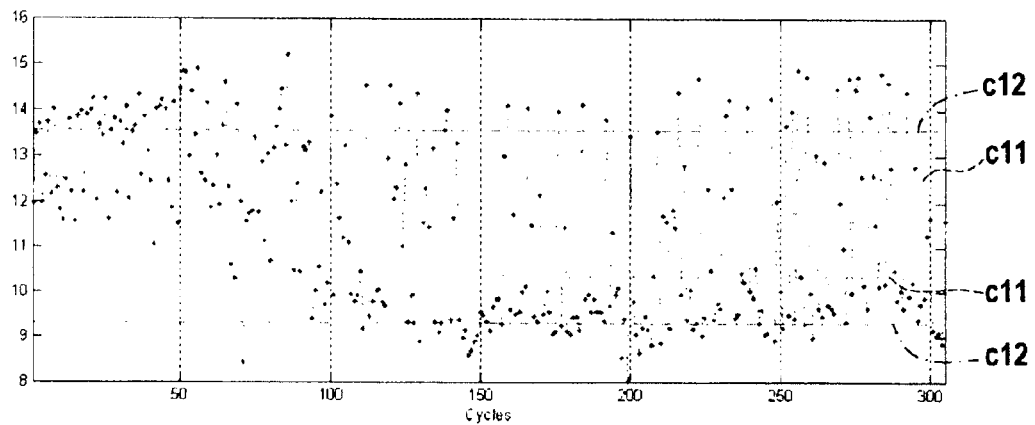
FIGS. 6A and 6B are graphical representations showing the gradient of the exhaust gas temperature as measured on the FIG. 1 aeroengine.
Figure 6B:
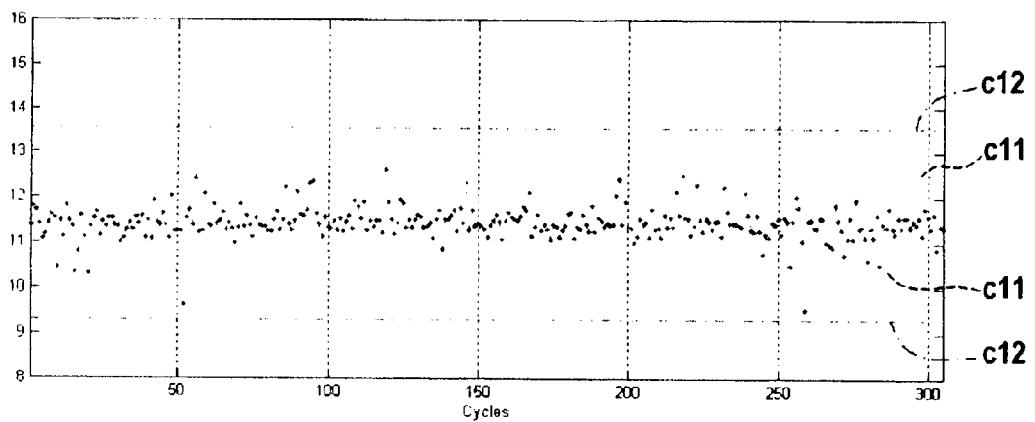

Another example is given in FIGS. 6A and 6B. FIG. 6A is a graphical representation of the values of a non-standardized initial indicator representing the temperature gradient of the exhaust gas as measured on an aeroengine in normal operation during successive flights.

Given that the engine is operating normally, the disparities between the values observed in FIG. 6A and the mean value are due essentially to different acquisition conditions.

In contrast, FIG. 6B shows the graphical representation after the indicator of FIG. 6A has been standardized in accordance with the present invention. This shows that the values of the standardized indicator may be considered as observations acquired under conditions that are strictly identical for each occasion the engine is monitored on each flight of the aircraft. Standardizing indicators in accordance with the present invention has the effect of eliminating dependencies on external context and takes account of stochastic interdependency relationships between the indicators themselves.

FIG. 6B shows that in normal operation of the engine, the probability of observing a signal that departs from the mean value by a value that is greater than 3σ is less than $3 \times 10^{-3}$ and the probability of observing a value that departs by more than 6σ is less than $2 \times 10^{-9}$. This shows clearly that monitoring an aeroengine element may be performed in identical manner regardless of the external acquisition conditions. Thus, application to an anomaly detector tool is not only made simpler, but it is also made easier for experts to interpret.

Furthermore, in a preferred implementation, the various steps of the method of the invention are executed by means of program code instructions.

Consequently, the invention also provides said computer program, the program being suitable for being implemented in the processor means or a computer system, the program including code instructions adapted to implementing a method of the invention as described above.

The program may make use of any programming language, and it may be in the form of source code, object code, or code intermediate between source code and object code, such as in a partially-compiled form, or in any other desirable form.

It is possible to use a computer-readable data medium that includes computer program instructions as mentioned above.

The data medium may be any entity or device capable of storing the program. For example, the medium may comprise storage means such as a read-only memory (ROM), e.g. a compact disk (CD) ROM, or a microelectronic circuit ROM, or any other recording means.

Furthermore, the information medium may be a transmissible medium such as an electrical or an optical signal, which may be conveyed via an electrical or optical cable, by radio, or by other means.

Alternatively, the information medium may be an integrated circuit in which the program is incorporated, the circuit being adapted to execute or to be used in the execution of the method of the invention.

The invention claimed is:

1. A method of standardizing data used for monitoring an aeroengine, the method comprising:
    collecting time-series measurements over time concerning said aeroengine;
    from said time-series measurements, calculating a set of indicators $Y=(y_1, \ldots, y_j, \ldots, y_m)$ that are specific to elements of said engine;
    from said time-series measurements, identifying an exogenous data set $X=(x_1, \ldots, x_n)$, representative of external context acting on said set of indicators Y;
    for each indicator $y_j$ of said set of indicators Y, constructing a projection space $E^{(j)}=\sigma(Y^{(j)}, X)$ generated by analytic transformations of a subset of indicators $Y^{(j)}=(y_1, \ldots y_{j-1}, y_{j+1}, \ldots y_m)$ comprising all of the indicators of said set of indicators Y except each said indicator $y_j$ and by said exogenous data set X;
    for each indicator $y_j$ of said set of indicators Y, calculating a corresponding estimator $\hat{y}_j$ by projecting said indicator $y_j$ using a regression technique onto said projection space $E^{(j)}=\sigma(Y^{(j)}, X)$, thereby forming a set of estimators $\hat{Y}=(\hat{y}_1, \ldots, \hat{y}_j, \ldots, \hat{y}_m)$ corresponding to said set of indicators $Y=(y_1, \ldots, y_j, \ldots, y_m)$; and
    normalizing each estimator $\hat{y}_j$ as a function of a reference value for the corresponding indicator $y_j$ and of a difference between each said estimator $\hat{y}_j$ and said corresponding indicator $y_j$ to form a set of standardized values $\tilde{Y}=(\tilde{y}_1, \ldots \tilde{y}_j, \ldots, \tilde{y}_m)$.

2. A method according to claim 1, wherein said time-series measurements are collected during normal operation of said aeroengine.

3. A method according to claim 1, wherein each standardized value $\tilde{y}_j$ is calculated by adding a mean or reference value for the corresponding indicator $\bar{y}_j$ to a difference between the corresponding indicator $y_j$ and the corresponding estimator $\hat{y}_j$, using the following equation: $\tilde{y}_j=\bar{y}_j+(y_j-\hat{y}_j)$.

4. A method according to claim 1, further comprising analyzing robustness of each estimator using a cross evaluation technique serving to select an optimum projection space.

5. A method according to claim 1, wherein said projection space is constructed using expert criteria with help of physical formulations of relationships between the indicators and between the indicators and the exogenous data.

6. A method according to claim 1, wherein said space is constructed automatically by using a neural network.

7. A method according to claim 6, wherein said neural network is a model having nodes.

8. A method according to claim 1, wherein the indicators of said set of indicators $Y=(y_1, \ldots, y_j, \ldots, y_m)$ are specific to physical and/or logical elements of said engine.

9. A method according to claim 1, wherein the indicators of said set of indicators $Y=(y_1, \ldots, y_j, \ldots, y_m)$ are calculated using expert criteria by constructing an FMECA.

10. A method according to claim 1, wherein the indicators are identified by referencing particular points or particular functions summarizing details or shapes of certain curves representative of said time-series measurements.

11. A method according to claim 1, wherein the exogenous data $X=(x_1, \ldots, x_n)$ acting on the indicators is identified using expert criteria by dependency analysis enabling context data associated with the indicators to be listed.

12. A method according to claim 1, wherein said regression is a linear regression.

13. A system for standardizing data used for monitoring an aeroengine, the system comprising:
    means for operating over time to collect time-series measurements from said aeroengine;
    means for calculating from said time-series measurements a set of indicators $Y=(y_1, \ldots y_j, \ldots, y_m)$ specific to elements of said engine;
    means for identifying from said time-series measurements an exogenous data set $X=(x_1, \ldots, x_n)$ representative of external context acting on said set of indicators Y;
    means for constructing for each indicator $y_j$ of said set of indicators Y, a projection space $E^{(j)}=\sigma(Y^{(j)}, X)$ generated by analytic transformations of a subset of indicators $Y^{(j)}=(y_1, \ldots, y_{j-1}, y_{j+1}, \ldots, y_m)$ comprising all of the indicators of said set of indicators Y except each said indicator $y_j$, and by said exogenous data set X;
    means for calculating for each said indicator $y_j$ of said set of indicators Y a corresponding estimator $\hat{y}_j$ by using a regression technique to project each said indicator $y_j$ onto said projection space $E^{(j)}=\sigma(Y^{(j)}, X)$, forming a set of estimators $\hat{Y}=(\hat{y}_1, \ldots, \hat{y}_j, \ldots, \hat{y}_m)$ corresponding to said set of indicators $Y=(y_1, \ldots, y_j, \ldots, y_m)$; and
    means for normalizing each estimator $\hat{y}_j$ as a function of a reference value for the corresponding indicator $y_j$ and of a difference between each said estimator $\hat{y}_j$ and said corresponding indicator $y_j$ so as to form a set of standardized values $\tilde{Y}=(\tilde{y}_1, \ldots, \tilde{y}_j, \ldots, \tilde{y}_m)$.

14. A non-transitory computer readable medium including computer executable instructions for implementing the standardization method according to claim 1 when executed by a processor.

* * * * *